United States Patent [19]

Camelli et al.

[11] Patent Number: 5,584,648
[45] Date of Patent: Dec. 17, 1996

[54] BAR GUIDE DEVICE FOR BAR FEEDERS IN MACHINE TOOLS

[75] Inventors: Marco Camelli; Enrico Nenni, both of Faenza, Italy

[73] Assignee: IEMCA S.p.A. Industria Elettromeccanica Complessi Automatici, Faenza, Italy

[21] Appl. No.: 548,399

[22] Filed: Oct. 26, 1995

Related U.S. Application Data

[63] Continuation of Ser. No. 74,625, Jun. 11, 1993, abandoned.

[30] Foreign Application Priority Data

Jun. 19, 1992 [IT] Italy .................................. BO92A0252
May 13, 1993 [IT] Italy .................................. BO93A0212

[51] Int. Cl.[6] .................................................. B65H 51/10
[52] U.S. Cl. ........................ 414/746.7; 414/18; 226/199
[58] Field of Search ..................... 226/196, 199; 414/15, 18, 746.7

[56] References Cited

U.S. PATENT DOCUMENTS

| | | | |
|---|---|---|---|
| 3,130,453 | 4/1964 | Haigler, Jr. | 226/199 |
| 3,331,488 | 7/1967 | Wellman | 414/746.7 X |
| 3,375,045 | 3/1968 | Zeidler | 226/199 |
| 3,858,731 | 1/1975 | Briggs | 414/746.7 X |
| 3,858,779 | 1/1975 | Doe | 226/199 |
| 4,037,733 | 7/1977 | Doe . | |
| 4,058,036 | 11/1977 | Austin | 82/38 A |
| 4,149,437 | 4/1979 | Winberg | 82/38 A |
| 4,776,200 | 10/1988 | Fabbri | 226/199 |

FOREIGN PATENT DOCUMENTS

| | | |
|---|---|---|
| 0212077 | 3/1987 | European Pat. Off. . |
| 0224894 | 6/1987 | European Pat. Off. . |
| 0384344 | 8/1990 | European Pat. Off. . |
| 4716190 | 6/1969 | Switzerland . |

*Primary Examiner*—Karen B. Merritt
*Assistant Examiner*—Janice L. Krizek
*Attorney, Agent, or Firm*—Guido Modiano; Albert Josif

[57] ABSTRACT

The present invention relates to a bar guide device for bar feeders in machine tools. The device has a plurality of guiding units which are longitudinally aligned. Each guiding unit has a pair of sprockets which are rotatable and have polygonal peripheral grooves. The grooves are constituted by semicylindrical recesses which have different diameters and form, in the mutually opposite position, a guiding channel for a bar to be fed toward the machine tool.

13 Claims, 8 Drawing Sheets

BAR GUIDE DEVICE FOR BAR FEEDERS IN MACHINE TOOLS

This is a continuation application of application Ser. No. 08/074,625 filed on Jun. 11, 1993, now abandoned.

BACKGROUND OF THE INVENTION

The present invention relates to a bar guide device for bar feeders in machine tools.

As is known, in the field of machining it is necessary to guide a bar both along its advancement direction and in its rotation.

Advancement requires the forming of a longitudinal slot to allow the passage of the element for coupling the bar pusher to the transfer train.

When the diameter of the bar varies, there is also the problem of changing the dimensions of the channel in which the bars are guided in order to avoid excessive play which might cause vibrations of the bars.

SUMMARY OF THE INVENTION

An aim of the present invention is to provide a device which can be adapted rapidly and safely so as to guide, within the tolerance plays, bars having different diameters. This aim is achieved with a device according to claims 1–2.

Within the scope of this-aim, an object of the present invention is to provide a device allowing the advancement of the bar pusher without requiring a continuous slot for the passage of the element for coupling the bar pusher to the transfer train.

This object is achieved with a device according to claims 3–10.

BRIEF DESCRIPTION OF THE DRAWINGS

Further features of the present invention will become apparent from the following description on the basis of the accompanying drawings, wherein.

DESCRIPTION OF THE PREFERRED EMBODIMENTS

With reference to the above figures, the device is generally designated by the reference numeral 1 and comprises a plurality of guiding units 2 distributed longitudinally.

Figure 13:
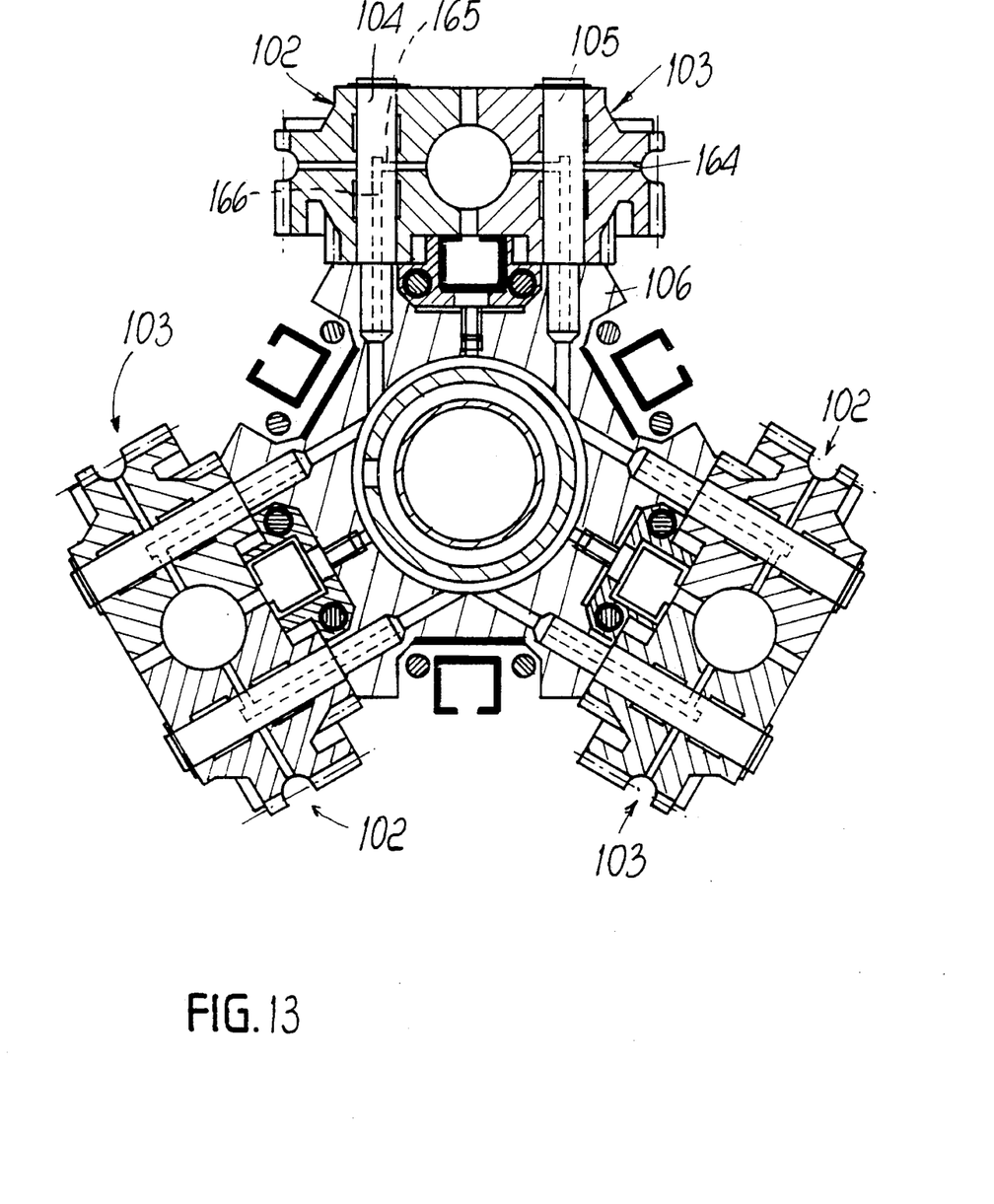
FIG. 13 is a transverse sectional view of an embodiment which provides for a plurality of guiding devices arranged angularly around a central longitudinal axis.

Each guiding unit 2 is constituted by a pair of sprockets 3 and 4 which are rotatably supported by respective parallel shafts 5 and 6 protruding from a stationary supporting framework (not shown in the drawing), which is constituted for example by a central shaft, such as the shaft designated by the reference numeral 106 in the embodiment of FIG. 13.

The sprockets 3 and 4 have opposite side wall faces 3a, 3b and 4a, 4b; comprise portions 7 and 8 which constitute constantly mutually meshing gears having on one side a cylindrical tang 9 and a toothed pinion 10 respectively.

A rack 11 is guided between the pinion 10 and the tang 9, meshes with the pinion 10 and has its back in tangential contact with the tang 9. The sprockets 3 and 4 have, at the opposite end with respect to the gears 7 and 8, collars or rime 7a and 8a having a diameter smaller than the mutual distance of their axes, thus forming a slot through which the element for coupling the bar pusher to the transfer train can pass.

A polygonal groove is formed in the peripheral region of the sprocket 3 and comprises a plurality of peripherally open recesses 12, 13, 14, 15 and 16 which constitute the sides of the polygonal groove and are distributed at identical angles around the shaft 5.

Figure 3:
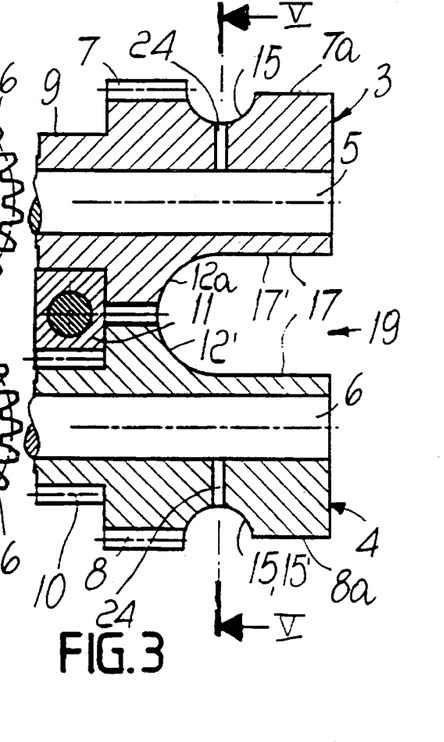
FIG. 3 is a sectional view of the sprockets in the bar receiving position.
Figure 4:
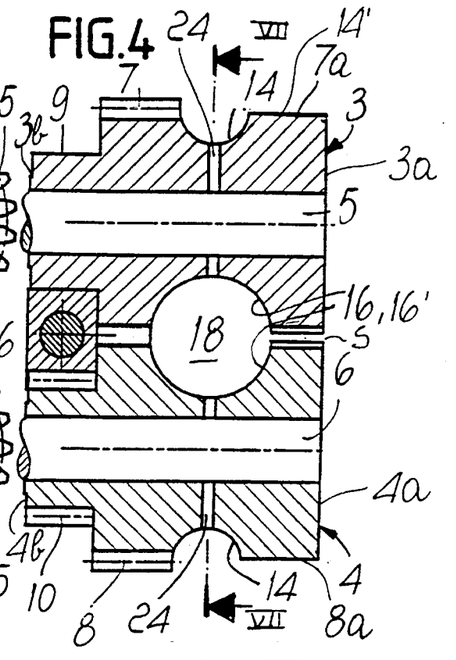
FIG. 4 is a sectional view of the sprockets in the bar guiding position.
Figure 5:
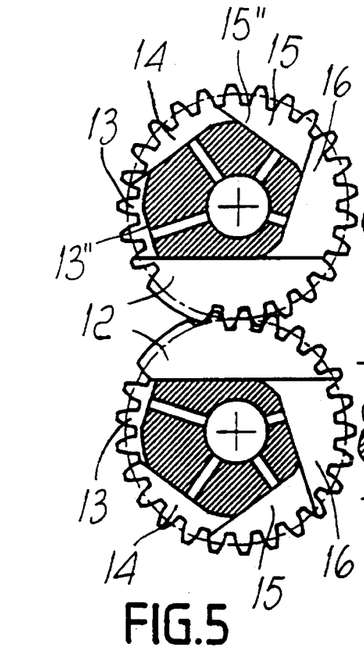
FIGS. 5 and 6 are sectional views taken along the planes V—V and VI—VI of FIGS. 3 and 4.
Figure 6:
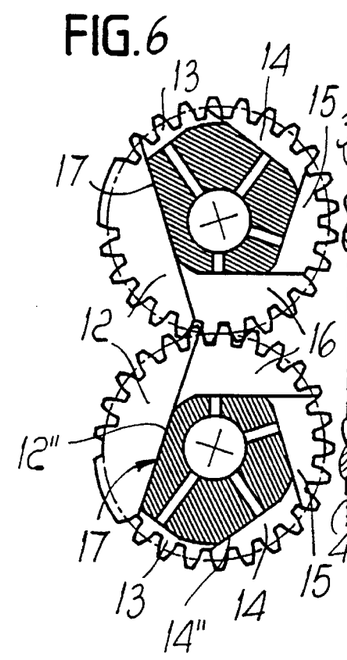
Figure 7:
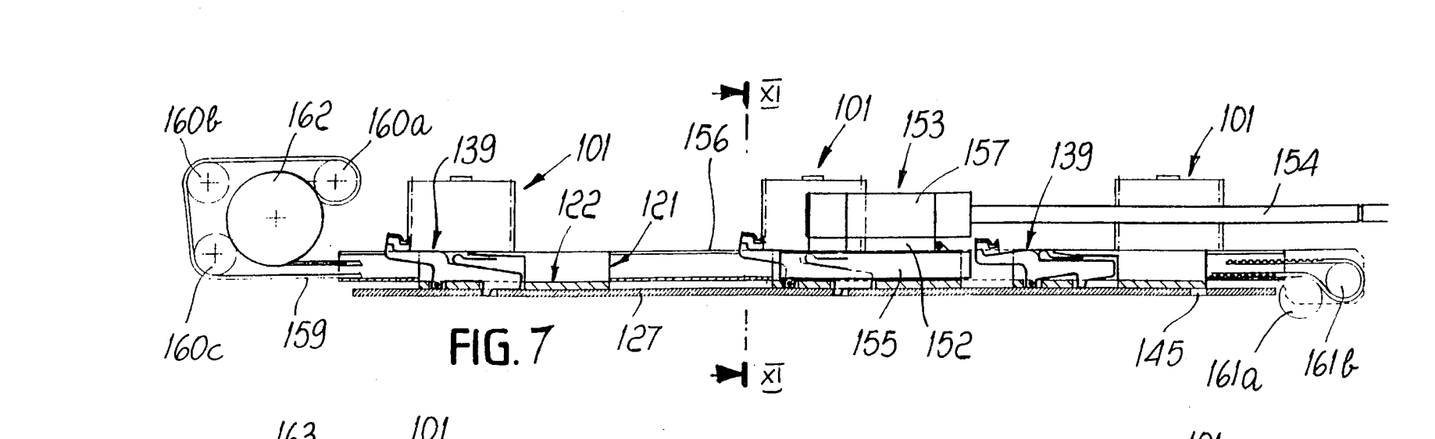
FIG. 7 is a side view of a different embodiment of the device.

The recesses 13–16 have a concone semicylindrical shape and their axes or dirictrices are at right angles to the axis of the shaft 5 and are all arranged on the same plane. The diameter of the generatrices of the recesses 13–16 furthermore increases from the recess 13 to the recess 16. In other words the recesses 13–16 are delimited by respective surface portions generated by respective semicircular generatices of different diameters of which the generatices 14', 15' and 16' are visible in FIGS. 3 and 4. The directrices of the respective surface portions of the recesses 12–16 are rectilinear lines 12", 13", 14", 15" and 16" visible in FIGS. 5 and 6, all lying in a common plane and forming an angle between each other and arranged at progressively different distances from the axes of respective shafts 5 thereby forming a polygonal directrix line. It should be noted that the recess 12 or its generatrix 12", differently from the others, is not concave or semicylindrical that is to say is not semicircular i.e. laterally closed but is laterally opened by a flattened or rectilinear portion 17 parallel to the shaft 5 and cutting through the collar 7a. In fact, as visible in FIG. 3, the generatrix 12' of the recess 12 is not semicircular but it has a rectilinear portion 17' extending from an arcuating portion 12a. The sprocket 4 also has a peripheral polygonal groove comprising a plurality of identical recesses i.e. generatices and directrices which are arranged symmetrically with respect to the recesses 12–16 and respective generatrices and directrices; and are designated by the same reference numerals.

The meshing of the gears 7 and 8 is chosen so that the recesses 12–16 of the sprocket 3 are arranged opposite to the respective recesses 12–16 of the sprocket 4 during the rotation of the sprockets 3 and 4.

In this manner, channels or cavities 18 with a diameter corresponding to the diameter of the oppositely arranged recesses are formed in each instance. In particular, when the recesses 12 are oppositely arranged between the sprockets 3 and 4, a laterally open channel 19 is formed which has walls constituted by the flattened portions 17 or generatrices 17'.

Figure 1:
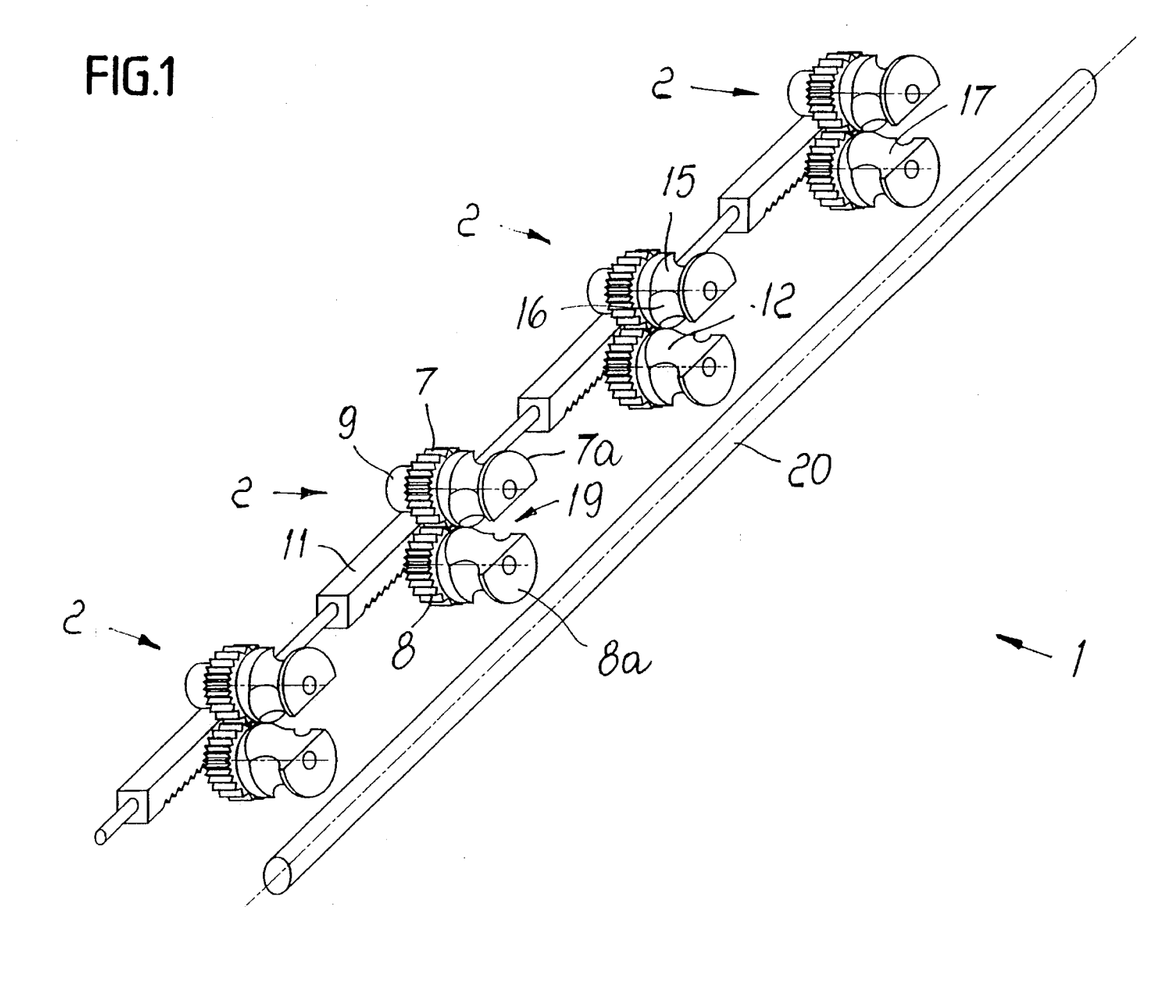
FIG. 1 is a perspective view of the device in the position for receiving a bar.
Figure 2:
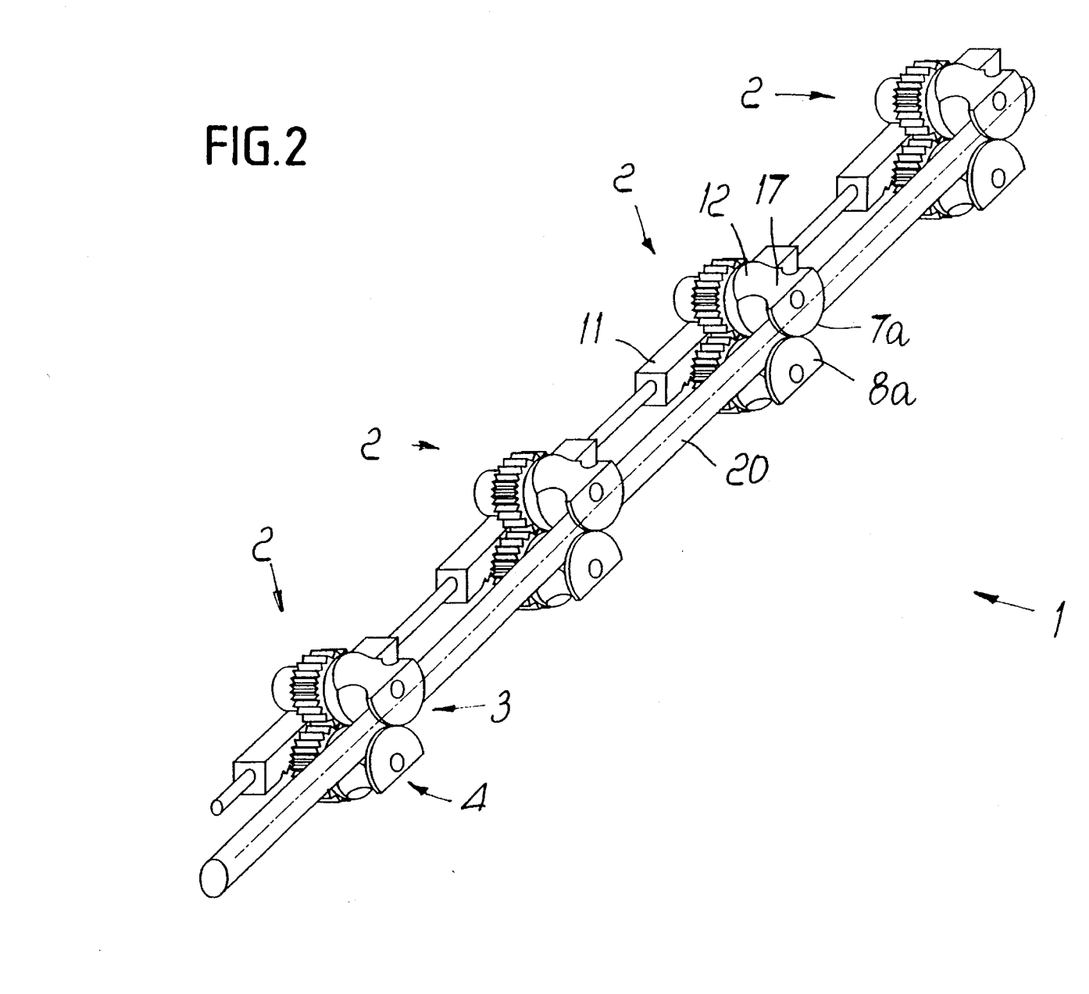
FIG. 2 is a perspective view of the device with a bar in a guiding position.

The operation of the described device will become apparent from the observation of FIGS. 1 and 2.

In the operating position of FIG. 1, the racks 11 are actuated so that the recesses 12 are mutually opposite so as to form the channel 19 between the sprockets 3 and 4.

In this situation it is possible to insert in the channels 19 of the various units 2 a bar 20 which must be fed toward a machine tool by means of an appropriate bar pusher. When the bar 20 has been inserted in the channels 19 of the guiding units 2, the rack 11 is actuated so that it rotates the sprockets 3 and 4 until the channels whose diameter is slightly larger than that of the bar 20 close. In the drawing it has been assumed that said channels are those defined by the recesses 16. Radial movements of the bar are effectively prevented by means of the closure of the channels; however, said bar remains guided longitudinally in order to be fed toward the machine tool.

It should be noted that the difference in diameter between the semicylindrical recesses 12-16 forms corners which, when appropriately chamfered, act as ramps and allow the bar 20 inserted in the channel 19 to rise in the selected channel when the sprockets 3 and 4 are rotated. As can be seen, a slot allowing the passage of the coupling element of a bar pusher remains between the collars 7a and 8a. Said slot does not allow to guide and feed small-diameter bars and is the source of noise. The embodiment of FIGS. 7-13 is provided in order to obviate these drawbacks.

In the embodiment of FIGS. 7-13, the device comprises a plurality of guiding units 101 distributed longitudinally.

Each guiding unit 101 is constituted (see FIG. 11) by a pair of sprockets 102 and 103 arranged symmetrically with respect to a longitudinal centerline plane C and rotatably supported on respective parallel shafts 104 and 105 which protrude from a base 106. Said base 106 is, for example (see FIG. 13), a prism-like drum rotatable about a longitudinal central axis and on the faces of which various guiding units, sized for guiding bars of various kinds, are arranged.

A peripheral groove 107 and 108 is formed in the sprockets 102 and 103 and delimits two toothed collars 109, 110 and 111, 112. For convenience in description, the toothed collars 109, 111 are termed "upper collars", whereas the toothed collars 110, 112 are termed "lower collars", with reference to the face 113 of the base 106 on which they are arranged.

The grooves 107,108 have a polygonal shape, since they comprise a plurality of semicylindrical recesses 107a, 107b, 107c, 107d, 107e and 108a, 108b, 108c, 108d, 108e which have co-planar axes or directrices at right angles to the shafts 104 and 105 and are distributed around said shafts so as to form identical angles, between said axes and directrices and so that the grooves 107 and 108 increase in depth i.e. in diameter of the corresponding semicircular generatrices along a circumferential direction.

The toothed collars or rims 109, 111 and 110, 112 mutually mesh and are arrangeable so that a recess 107a-107e of one sprocket 102 is arranged opposite to a corresponding recess 108a-108e of the sprocket 103 which has the same generatrix diameter, so as to circumscribe a circular cavity or channel, the diameter whereof corresponds to the diameter of the oppositely arranged recesses.

The deepest recesses 107a, 108a, differently from the other recesses, are not semicylindrical but are laterally opened by chamfers 114, 115 which are slightly flared toward the free ends of the shafts 104,105 which affect the upper collars or rims 109 and 111. The lower collars 110, 112 furthermore have faces 114a, 115a parallel to the recesses directrices of the 107a, 108a. As more clearly shown by the plan view of FIG. 12 (in which the two sprockets are spaced in a non-meshing position for the sake of clarity of the drawing), the plane of the chamfers 114, 115 is slightly inclined with respect to the plane of the respective faces 114a, 115a and thus with respect to the directrix of the recesses 107a, 108a. The upwardly i.e. laterally with respect to the rims 109, 111 open seats in which the bar to be machined is insertable are delimited or formed in the angular position of the sprockets in which the chamfers 114, 115 are parallel to the longitudinal centerline plane C. In this position the faces 114a, 115a and the recesses 107a, 108a converge in the bar advancement direction A (see FIG. 12).

Between the lower collars 110, 112 and the face 113, the sprockets have pinions 117, 118 having a smaller diameter than the collars 110, 112.

Two respective racks 119, 120 mesh with the pinions 117, 118 and are formed on the side walls of a sliding block 121 sliding in a complementarily shaped slot 122 formed longitudinally in the face 113 of the base 106.

The sliding block 121 has a U-shaped cross-section, with two mutually parallel walls 123, 124 on the outer faces of which the racks 119, 120 are formed; said walls laterally delimit a channel 125 and rise from a plate 126. The plate 126 slides appropriately on a strip 127 arranged so that it covers the bottom of the slot 122.

Two longitudinal holes 128, 129 are formed in the plate 126 laterally to the channel 125. The holes 128 of the sliding blocks 121 are aligned, and a rod 130 is driven through them; said rod is actuatable in the direction A by a pneumatic or hydraulic jack 131 against the biasing action of a return spring 132. Collars 133 are arranged on the rod 130 and, when the jack 131actuates the rod 130 in the direction A, act as actuation elements for the sliding blocks 121. Springs 134 are arranged between the sliding blocks 121 and the collars 133 downstream of said collars and keep the sliding blocks 121 in abutment against the collars located upstream. An abutment 130 a is provided at the end of the rod 130 and is suitable to interact with a pin, chosen among a plurality of pins 130b, when the rod 130 is moved back by the spring 132 in a direction opposite to the direction A once the action of the jack 131 has ended. Thus the pins 130b cause the sliding blocks to stop at a point in which the angular position of the sprockets produces the mutually opposite arrangement of the recesses 107a-107e and 108a-108e which correspond to the diameter of the bars to be machined.

A rod 135 is driven in the holes 129 of only some of the initial units 101, and collars 136 are fixed on said rod along the portions arranged between the units 101. The rod 135 is actuatable by means of a jack 137 so that it moves the sliding blocks 121 in the same direction A independently of the activation of the jack 131.

A plate-like pawl 139 is pivoted in each sliding block by means of a pivot 138 and is accommodated in a seat 140 formed on the internal face of the wall 123.

The pawl 139 (see FIG. 10) comprises an arm 141 provided with a tooth 142 protruding through a slot 143 of the base plate 126 of the sliding block 121. The pawl 139 is actuated against the bottom plate 126 by a spring 144 so that in a given longitudinal position of the sliding block 121 the tooth 142 can engage, through the slot 143, an opening 145 formed in the strip 127 at each guiding unit 101.

Figure 8:
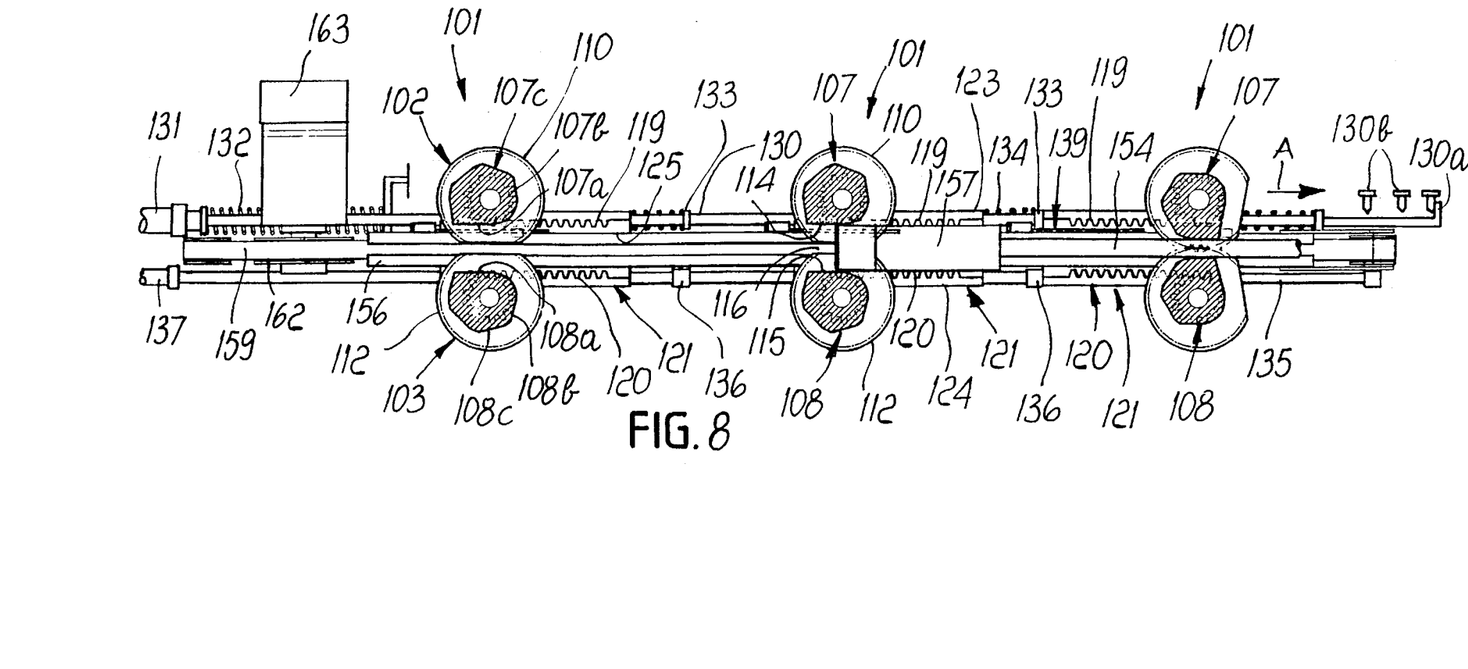
FIG. 8 is a plan view.

The pawl 139 has a second arm 146 protruding from the seat 140 and ending with a tab 147 in which a channel 148 is formed; said channel 148 is Z-shaped, with two parallel and horizontal portions joined by a vertical portion which forms two abutments constituted by steps 149 and 150. A pin 151 engages the channel 148 and protrudes from a rib 152 of a coupling element 153 of a pusher or rod 154 for the advancement of the bars (FIG. 8).

In order to allow the passage of the pin 151 and of the tab 147 below the sprocket 102, an angular portion 154a of the lower collar 110 has been removed. The coupling element 153 comprises a slider 155 guided in a U-shaped profiled element 156 extending along the channels 125 of the sliding blocks 121. The slider 155 is connected, by means of the rib 152, to a bush 157 from which the bar pusher rod 154 protrudes. The diameter of the bush 157 is equal to the maximum diameter formed by the mutually opposite arrangement of the recesses 107a, 108a having the largest diameter. A passage 158 is formed in the slider 155 and is crossed by the two straight and superimposed portions of a belt 159 for moving the bar pusher; the upper portion of said belt is fixed to the slider.

The belt 159 runs within the profiled element 156 and is closed in a loop around a plurality of guiding pulleys 160a, 160b, 160c and 161a, 161b and a pulley 162 driven by a motor 163.

The operation of the described device is as follows.

Assume that one wishes to feed toward a machine tool bars having a diameter equal to the opening which can be obtained by arranging the recesses 107e, 108e of the sprockets having the smallest diameter mutually opposite. For this purpose, the pin 130b is selected; by virtue of the spring 132, said pin stops the abutment 130a in the position in which the recesses 107e, 108e are arranged mutually opposite. In this position, the springs 134 keep the sliding blocks 121 in abutment against the collars 133.

Figure 12:
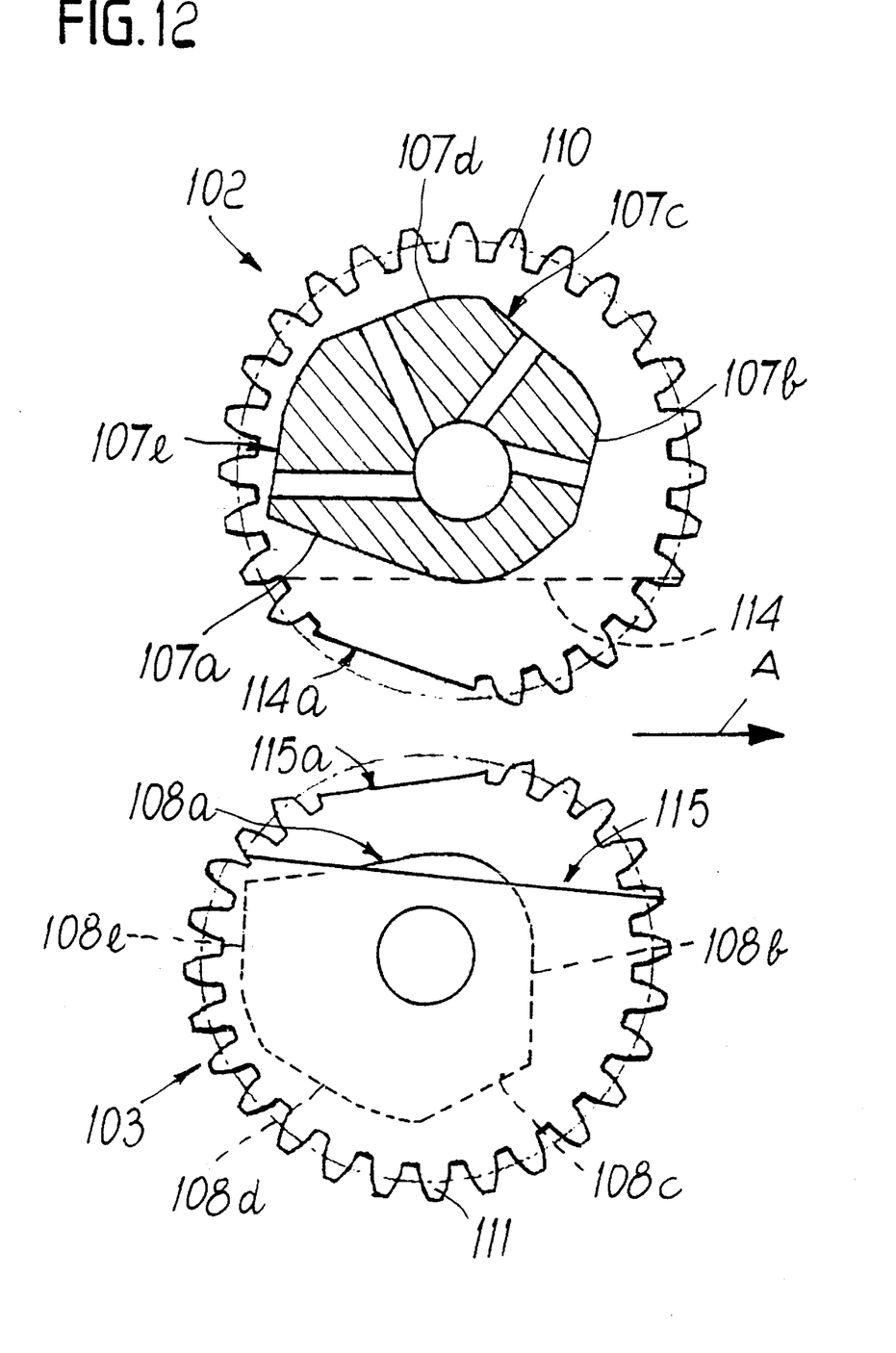
FIG. 12 is a plan view of a unit with a sprocket shown in cross-section as taken along the plane XII—XII of FIG. 11.

Assuming that the bar pusher 154 is in retracted position, first of all the bar is loaded between the sprockets of the guiding units. For this purpose, the rod 130 is actuated, by means of the jack 131, in the direction A so that the collars 133, by acting on the sliding blocks 121, produce the simultaneous sliding of all the sliding blocks and thus the rotation of the sprockets into the position in which the chamfers 114, 115 are mutually opposite. As shown by FIG. 12, the faces 114a, 115a form an acute angle in the direction A.

Since the chamfers 114,115 are mutually parallel in this position, it is possible to insert a bar between them.

When the jack 131 is deactivated, the spring 132 returns the rod 130 into abutment against the pin 130b, thus stopping the sliding blocks 121 in the point in which, by means of the rotation of the sprockets 102, 103 due to the racks 119,120, the recesses 107e, 108e which allow the best guiding of the bar are mutually opposite.

It should be noted that the diameter of the recesses is the most suitable among those available in order to guide the bar with the smallest possible play and at the same time allow the advancement of the bar pusher, which usually has a larger diameter than the bar.

Figure 9:
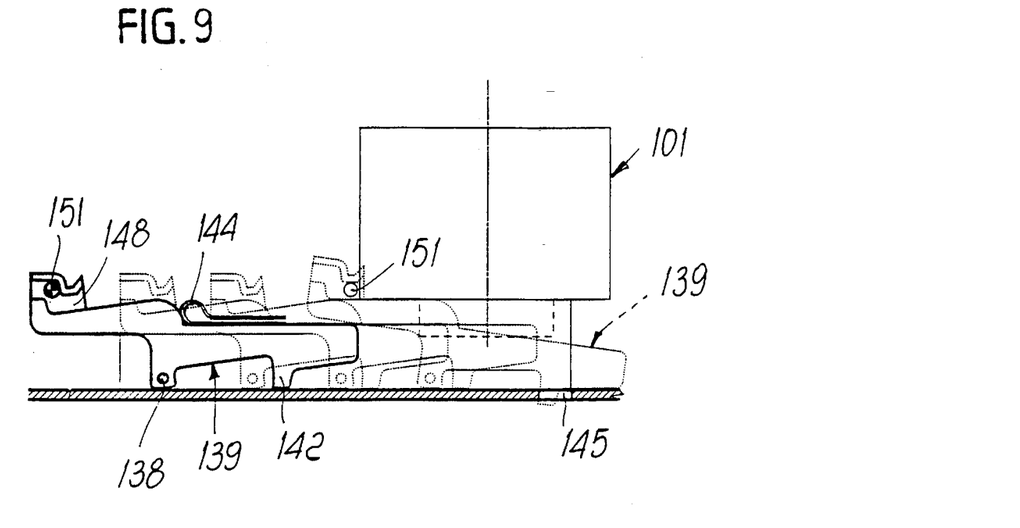
FIGS. 9 and 10 are enlarged-scale side views of a detail of the device in two operating conditions.

After loading has thus been completed and after the bar has been positioned in the recesses 107e, 108e of the sprockets, the motor 163 is activated so that it causes the advancement of the bar pusher 154 through the guiding units, the sprockets of which are momentarily orientated by the wedge-like action applied by the rib 152 in the faces 114a, 115a so as to move mutually opposite the recesses 107a, 108a which have the largest diameters and form the passage channel for the bush 157 of the bar pusher. As soon as this preliminary angular positioning of the sprockets by the rib 152 has been completed, the pin 151 of the coupling element 153 enters the channel 148 of the pawl 139 and abuts against the step 149 (FIG. 9).

Figure 10:
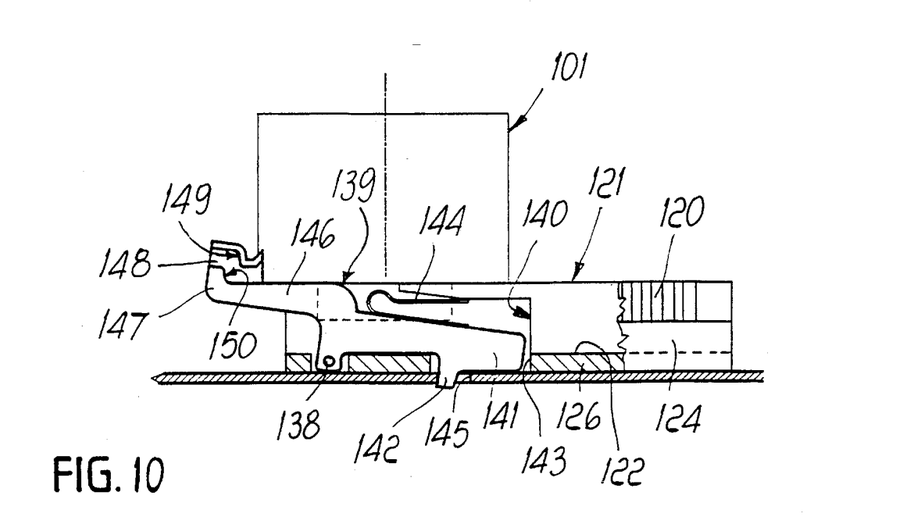
Figure 11:
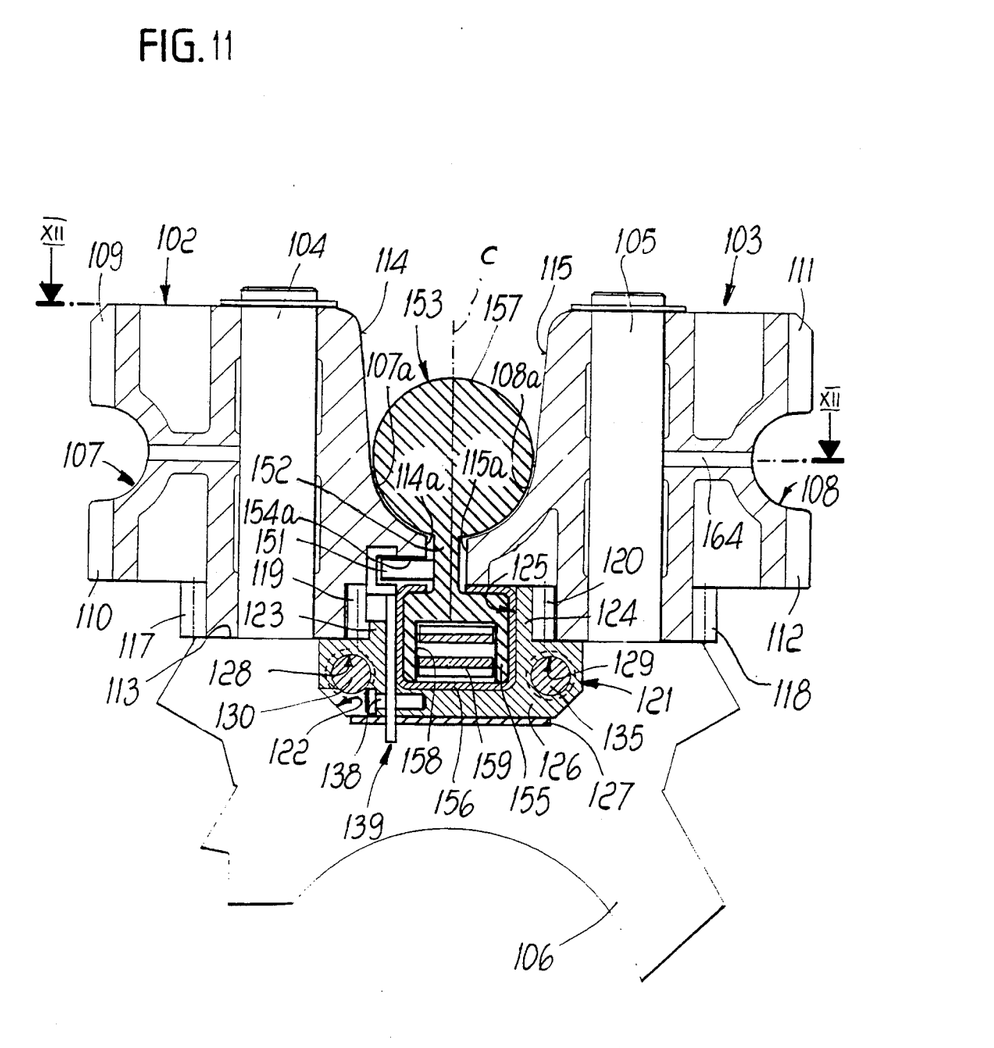
FIG. 11 is a transverse sectional view, taken along the plane XI—XI of FIG. 7.

Since the pawl is prevented from rotating by the abutment of the tooth 142 against the strip 127, the sliding block 121 is moved in contrast with the action of the spring 134, and the sprockets 102, 103 consequently rotate. When the tooth 142 reaches the opening 145, the thrust applied by the pin 151, combined with the thrust of the spring 144, produces the engagement of the tooth 142 in the opening 145 and the lifting of the tab 147, so that the pin 151 can disengage from the step 149 and protrude forward (FIG. 10).

Since the tooth 142 is kept in the opening 145 by the spring 144, and since in this position the slot 116 forms and the recesses 107a, 108a are mutually opposite, the coupling element 153 can continue its stroke through the related guiding unit 101.

The above described operations are repeated for all the units crossed, which remain all in "open" position at the end of the advancement of the bar pusher.

The initial conditions are restored during the return stroke of the bar pusher. During said return stroke, the pin 151 in fact enters the channel 148 on the opposite side, so that it abuts on the step 150 causing the oscillation of the pawl 139 in the position in which the springs 144, previously pressed by the advancement stroke of the sliding blocks 121, keep the step 149 rested on the pin 151.

In this manner, during the return stroke of the bar pusher the sliding blocks do not snap into the initial position but are sequentially carried backward, following the movement of the belt 159.

The described device perfectly achieves the intended aim and objects. In particular, it should be noted that the collars 109–112, by virtue of the meshing of the sets of teeth, fully close the seats for the passage of the bars, which accordingly are always perfectly guided.

A particularity of the present invention is that it allows to load the bars from below in a drum feeder such as the drum feeder shown in FIG. 13. In this case, the bar remains firmly retained within the lower guiding units, but would fall if use of a new bar pusher rod 154, which requires the temporary opening of the guiding channel (i.e. the rotation of the sprockets 102, 103 into a position in which the recesses 107a, 108a are mutually opposite), is intended. The described device obviates this by providing, by means of the activation of the jack 137 and of the traction applied by the rod 135 on the sliding blocks 121, the opening only of the guiding units allowing to apply the bar pusher rod, whereas the other guiding units maintain their closed position. According to a different embodiment of the present invention, radial holes 24, 164 (FIGS. 3, 4, 11, 12 and 13) are formed in a median plane of each sprocket and lead into the recesses 12–15, 107b–107e and 108b–108e.

The radial holes 164 of each sprocket 102, 103 are connectable to a hole 165 formed radially in the sprocket rotation pivot 104,105. The holes 165 lead into holes 166 which extend axially in the pivots 104, 105 and are connected to a source for the supply of lubricant. In this manner, the sprockets act as lubricant distributors, since they allow to deliver lubricant only into the recesses forming the guiding channels of the bars. It should be noted that there are no radial holes toward the recesses 107a, 108a in order to avoid the leakage of lubricant when the guides are open.

I claim:

1. A bar guide device for bar feeders in machine tools, comprising a plurality of mutually aligned bar guiding units defining a longitudinal extension of said bar guide device, each unit comprising at least one pair of cooperating sprocket members rotatable about mutually parallel axes arranged transverse to said longitudinal extension, each of said sprocket members having: opposite spaced apart side wall faces; peripheral rim formations disposed between said side wall faces; and a respective axis of rotation extending along one of said parallel axes; said peripheral rim formations comprising, for each one of said sprocket members, a shaped groove having a shaped surface extending around said respective axis of rotation, said shaped groove having a plurality of successive directrices lying in a common plane and a plurality of successive generatrices extending transverse to said directrices for defining a plurality of successive peripherally open recesses in said shaped surface of said shaped groove, said successive directrices lying in said common plane transverse to said respective axis of rotation and being rectilinear and forming an angle with respect to each other and surrounding said respective axis of rotation progressively at a different distance from said respective axis of rotation thereby to form a polygonal directrix line surrounding said respective axis of rotation for defining said recesses at progressively different distances from said respective axis of rotation, each of said successive generatrices corresponding to a respective directrix of said directrices for defining a respective peripherally open concave recess and lying in a respective plane transverse to said respective directrix, said successive generatrices being comprised of different generatrices for each respective directrix, at least one of said generatrices being in the form of a flattened line portion extending inwards from one of said side wall faces to an intermediate position between said opposite side wall faces, said at least one generatrix having an arcuated form extending transverse to said flattened line portion thereby to define with a respective directrix a peripherally and laterally open recess, others of said generatrices having an arcuated peripherally open and laterally closed shape, each generatrix to define with a respective rectilinear directrix a peripherally open laterally closed concave recess thereby to form in said shaped groove a plurality of peripherally open laterally closed recesses of progressively different radii and having lateral side walls laterally closing said concave recesses, said pairs of cooperating sprocket members having said sprocket members of each pair lying in a common central line plane and with at least two of said peripheral rim formations thereof in substantially tangential relationship to each other and angularly arranged with respect to each other with selected recesses of one of said sprocket members of said pair of sprocket members facing a selected corresponding recess of another of said two sprocket members of said pairs of sprocket members, thereby, when upon adjusting angular rotation of said sprocket members of said pairs of sprocket members said laterally open recess of one of said sprocket members of said pairs of sprocket members substantially tangentially faces a corresponding laterally open recess of another of said sprocket members of said pairs of sprocket members, a lateral opening is formed therebetween for the passage and containment therein of a bar to be guided, and thereby to guide said bar when upon a further selected adjusting angular rotation of said sprocket members of said pairs of sprocket members a selected peripherally open concave recess is shifted over said bar to substantially tangentially face a corresponding peripherally open concave recess of another of said sprocket members of said pairs of sprocket members whereby to define a closed cavity of selected size containing said bar in guiding relationship therewith when said sprocket members are stationary, the device further comprising sprocket position adjusting means for selectively transmitting angular rotation to said sprocket members.

2. The device according to claim 1, wherein said means for selectively transmitting angular rotation comprise rack means extending along said longitudinal extension and wherein said rim formations of said sprocket members of each pair of sprocket members comprise meshing toothed rims, at least one of said sprocket members having further a pinion formation meshing with said rack means controlling the angular positioning of said sprockets.

3. The device according to claim 1, wherein said sprocket members are rotatable about parallel shafts defining said parallel axes and wherein each of said parallel shafts has an axial lubricating channel terminating with one end thereof in an intermediate position of said shaft and connected with another end thereof with a source of lubricant, said shaft has a radial lubricating channel opening with one end thereof into said axial lubricating channel and with the other end thereof opening into the outside at a peripheral portion of said shaft and wherein said sprocket members have radial lubricating holes leading from said peripherally open recesses towards said radial lubricating channel to thereby lubricate said peripherally open recesses.

4. The device according to claim 11, characterized in that the device is applied on a drum-type bar feeder.

5. The device according to claim 1, wherein said means for selectively transmitting angular rotation to said sprocket members of said bar guiding units comprise rack means extending along said longitudinal extension and wherein said rim formations of said sprocket members of each pair of sprocket members comprise meshing toothed rims, at least one of said sprocket members having further pinion formations meshing with said rack means controlling the angular positioning of said sprockets, the device further comprising elongated bar pusher means with coupling elements arranged along said longitudinal extension and actuation means for advance and return stroke movements of said pusher means in an advance stroke direction and a return stroke direction respectively, wherein said rim formations have said peripherally open and laterally closed concave recesses and laterally open recesses providing passages for inserting said coupling elements into said laterally open recesses, said rack means having each at least one pawl pivoted thereon, said pawl having abutment means for interacting with said coupling element during advance stroke movement of said bar pusher means to thereby cause through said rack means angular rotation of said sprocket members from a reference angular position into a selected angular position in which said laterally open recesses of said pairs of sprocket members face each other to form said passages for said coupling elements, said pawl having further abutment means interacting with said coupling element to cause through said rack means opposite angular rotation of said sprocket members into said reference angular position during a return stroke of said bar pusher means.

6. The device according to claim 5 having further longitudinally extending stationary sliding surface means for said rack means and wherein said pawl has pivot means in an intermediate position thereof for pivotal connection with said rack means, a first arm extending from said intermediate position in said return stroke direction, said first arm having said abutment means thereof in the form of two opposite abutment surfaces for cooperation with said coupling element, said pawl further comprising a second arm extending from said intermediate position in the advance stroke direction, said second arm having a tooth slidable along said sliding surface means and being spring biased to urge said tooth against said sliding surface means, said sliding surface means having a notch therein for stopping engagement with said tooth thereby determining an end of advance stroke position of said rack means in which said rack means cause said sprocket members to assume said selected angular position, said two opposite abutment surfaces cooperating with said coupling element to tilt said alternatively in opposite directions when said coupling element engages alternatively said two opposite abutment surfaces.

7. The device according to claim 5, further comprising jack means and sliding surface means for said rack means and wherein said rack means have a sliding block on which racks are formed, said sliding block having a U-shaped cross-section with two parallel walls externally provided with said racks, which mesh with said pinion formations formed on said sprocket members, said two parallel walls internally forming a guiding channel for said coupling element of said bar pusher means, said sliding blocks being actuatable along said sliding surface means extending along said longitudinal extension, by means of said jack means over such an extent that said racks rotate said sprocket members of said bar guiding units between a loading position in which said laterally open recesses face each other to form said laterally open cavity, so as to allow the loading of the bar to be machined, and a guiding position in which the peripherally open and laterally closed recesses corresponding to the diameter of said bar face each other so as to receive therein and guide said bar.

8. The device according to claim 7, wherein said jack means include a second jack and a second actuation rod connected with one end thereof to said second jack and extending along said longitudinal extension, said sliding blocks each having a second longitudinal hole through which said second actuation rod is driven, said bar guiding units including a group of, from the direction of said second jack, initial bar guiding units, said second actuation rod having abutments engaging said sliding blocks of said initial guiding units for transmitting translatory movement to said sliding blocks and the racks thereof of said initial bar guiding units when said second jack is actuated to thereby rotate said sprocket members of said initial bar guiding units through said sliding blocks and rack means thereof into a position for inserting therein said bar pusher means.

9. The device according to claim 7, wherein said jack means include a first jack and a first actuation rod connected with one end thereof to said first jack and extending along said longitudinal extension, said sliding blocks having each a first longitudinal hole through which said first actuation rod is driven, said first actuation rod having abutments engaging said sliding blocks for transmitting translatory movement to said sliding blocks and the racks thereof when said first jack is actuated to thereby rotate said sprocket members between said loading position and said bar guiding position, said first actuation rod having spring means mounted thereon for maintaining in engagement said abutments thereof with said sliding blocks.

10. The device according to claim 9, further comprising selectively operable stroke limiters for determining selected end of stroke positions of said actuation rod and said rack means in engagement with said abutments of said rod, thereby to cause said sprocket members of said pairs of sprocket members to assume corresponding selected angular positions.

11. A sprocket structure for bar guide devices, comprising an axis of rotation, opposite spaced apart side wall faces, peripheral rim formations disposed between said side wall faces, at least one of said peripheral rim formations being a toothed rim, another of said peripheral rim formations being in the form of a shaped groove having a shaped surface extending around said respective axis of rotation, said shaped groove having a plurality of successive directrices lying in a common plane and a plurality of successive generatrices extending transverse to said directrices for defining a plurality of successive peripherally open recesses in said shaped surface of said shaped groove, said successive directrices lying in said common plane transverse to said axis of rotation and being rectilinear and forming an angle with respect to each other and surrounding said axis of rotation progressively at a different distance from said axis of rotation thereby to form a polygonal directrix line surrounding said axis of rotation for defining said recesses at progressively different distances from said axis of rotation, each of said successive generatrices corresponding to a respective directrix of said directrices for defining a respective peripherally open concave recess and lying in a respective plane transverse to said respective directrix, said successive generatrices being comprised of different generatrices for each respective directrix, at least one of said generatrices being in the form of a flattened line portion extending inwards from one of said side wall faces to an intermediate position between said opposite side wall faces, said at least one generatrix having an arcuated form extending transverse to said flattened line portion thereby to define with a respective directrix a peripherally and laterally open recess, others of said generatrices having an arcuated peripherally open and laterally closed shape, each generatrix to define with a respective rectilinear directrix a peripherally open laterally closed concave recess thereby to form in said shaped groove a plurality of peripherally open laterally closed recesses of progressively different radii and having lateral side walls laterally closing said concave recesses.

12. A bar guide device for bar feeders in machine tools, comprising a plurality of mutually aligned bar guiding units defining a longitudinal extension of said bar guide device, each unit of said guiding units comprising at least one pair of cooperating sprocket members rotatable about mutually parallel axes arranged transverse to said longitudinal extension, each sprocket member of said pair of sprocket members comprising a plurality of peripherally open recesses, each recess of said plurality of recesses having an axis which is transverse to an axis of rotation of said sprocket member and which is spaced a distance away from said axis of rotation, said distance progressively increasing for successive recesses of the sprocket member and said sprocket members cooperating upon rotation thereof to form a plurality of mutually different sized channels for accommodating a bar to be fed.

13. The device of claim 12 wherein one channel of said plurality of channels when formed is open laterally and comprises flattened portions, and wherein remaining channels of said plurality of channels when formed are essentially completely closed with a circular cross section.

\* \* \* \* \*